(12) United States Patent
Sun et al.

(10) Patent No.: US 11,016,838 B2
(45) Date of Patent: May 25, 2021

(54) METHOD, APPARATUS AND COMPUTER STORAGE MEDIUM FOR ERROR DIAGNOSTICS OF AN APPLICATION

(71) Applicant: EMC IP Holding Company LLC, Hopkinton, MA (US)

(72) Inventors: Li Sun, Chengdu (CN); Fei Peng, Chengdu (CN); Zhongyi Zhou, Chengdu (CN); Fubin Zhang, Chengdu (CN); Wenhao Dai, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 108 days.

(21) Appl. No.: 16/284,634

(22) Filed: Feb. 25, 2019

(65) Prior Publication Data
US 2020/0133756 A1    Apr. 30, 2020

(30) Foreign Application Priority Data
Oct. 26, 2018 (CN) .......................... 201811261869.6

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0787* (2013.01)

(58) Field of Classification Search
CPC ............... G06F 11/079; G06F 11/0751; G06F 11/0787; G06F 11/0709
See application file for complete search history.

(56) References Cited

U.S. PATENT DOCUMENTS

| | | | |
|---|---|---|---|
| 10,740,216 B1 * | 8/2020 | Parent .................... | G06N 20/00 |
| 2010/0223499 A1 * | 9/2010 | Panigrahy ............. | G06F 11/079 714/19 |
| 2012/0166869 A1 * | 6/2012 | Young ................. | G06F 11/0754 714/15 |
| 2014/0298093 A1 * | 10/2014 | Cook ...................... | G06F 11/36 714/27 |

* cited by examiner

*Primary Examiner* — Charles Ehne
(74) *Attorney, Agent, or Firm* — Chamberlain, Hrdlicka, White, Williams & Aughtry (57) ABSTRACT

Embodiments of the present disclosure provide methods, apparatus, and computer storage media for application error diagnosis. The method of application error diagnosis may include obtaining information related to an error in an application, generating a code of the information related to the error in the application, determining a similarity between the code and at least one predetermined code, wherein the at least one predetermined code is being associated with a known software bug. The method further includes determining at least one software bug related to the error in the application by comparing the similarity with a predetermined threshold.

18 Claims, 6 Drawing Sheets

|     | $W_1$ | $W_2$ | ... | $W_j$ | ... | $W_{jN}$ |
|-----|-------|-------|-----|-------|-----|----------|
| $L_1$ | $W_{11}$ |   |   |   |   |   |
| $L_2$ |   | ... |   |   |   | $W_{2j}$ |
| ... |   |   | ... |   |   |   |
| $L_i$ |   |   |   | $W_{ij}$ |   |   |
| ... |   |   |   |   | ... |   |
| $L_M$ |   |   |   |   |   | $W_{MN}$ |

METHOD, APPARATUS AND COMPUTER STORAGE MEDIUM FOR ERROR DIAGNOSTICS OF AN APPLICATION

FIELD

Embodiments of the present disclosure generally relate to the technical field of software applications and, more particularly, to a method, an apparatus, and a computer storage medium for application error diagnosis.

BACKGROUND

Ideally, it is desirable that applications provided to customers have zero software bugs. However, software with known bugs may still be released. In addition, some bugs may be detected after a product is released and will be fixed in later releases. However, how to detect a problem and how to provide a right solution to the customer is a problem that should be solved when the problem occurs in the customer's environment.

SUMMARY

Embodiments of the present disclosure provide a method, an apparatus, and a computer storage medium for application error diagnosis.

In a first aspect of the present disclosure, there is provided a method of application error diagnosis. The method comprises obtaining information related to an error in an application; generating a code of the information related to the error in the application; determining a similarity between the code and at least one predetermined code, each of the at least one predetermined code being associated with a known software bug; and determining at least one software bug related to the error in the application by comparing the similarity to a first threshold.

In some embodiments, generating the code may comprise vectorizing the information to obtain the code. In a further embodiment, vectorizing the information may comprise vectorizing words in the information to obtain word vectors; and obtaining a vector of a sentence in the information based on the word vectors.

In some embodiments, generating the code may comprise deleting a pause word from the information; and generating the code based on the information with the pause word deleted.

In some embodiments, the information may be vectorized based on a term frequency-inverse document frequency (TF-IDF) or a Word2vec model.

In some embodiments, the information related to the error in the application may comprise environmental information of the application and at least one of the following a critical error log segment from a customer environment, bug information from a bug tracking system, and solution information from a support page or a support server.

In some embodiments, the at least one predetermined code may be from a pre-stored corpus.

In some embodiments, determining the similarity between the code and the at least one predetermined code may comprise determining the similarity based on a Euclidean distance or a cosine function between the codes.

In some embodiments, the method may further comprise obtaining information related to the known software bug; and updating the at least one predetermined code based on the information related to the known software bug for subsequent error diagnosis.

In some embodiments, the method may further comprise obtaining description of the determined at least one software bug; determining a description similarity between the description and a description of at least one predetermined solution; and determining, based on a comparison of the determined description similarity with a second threshold, at least one solution for solving the error in the application. In a further embodiment, the at least one predetermined solution may be from a support webpage or a support server.

In another embodiment, determining a description similarity between the description and a description of at least one predetermined solution may comprise obtaining a vectorized representation of the description of the at least one software bug; and determining the description similarity by comparing the vectorized representation with a description vector of the at least one predetermined solution. In a further embodiment, determining the description similarity between the vectorized representation and the description vector of the at least one predetermined solution may be based on a Euclidean distance or a cosine function between the vectors. In some embodiments, the description may comprise a title of at least one software bug.

In some embodiments, the method may further comprise obtaining an available solution related to the application; and updating, based on the obtained available solution, the at least one predetermined solution for subsequent error diagnosis.

In a second aspect of the present disclosure, there is provided an electronic device. The electronic device comprises at least one processor and at least one memory. The memory is coupled to at least one processor and includes a computer program code stored therein. The computer program, when executed by the at least one processor, causes the electronic device to perform any method of the first aspect of the present disclosure.

In a third aspect of the present disclosure, there is provided an apparatus for application error diagnosis. The apparatus comprises a data collector configured to obtain information related to an error in an application; an information encoder configured to generate a code of the information related to the error in the application; an analyzer configured to determine a similarity between the code and at least one predetermined code, each of the at least one predetermined code being associated with a known software bug; and an error diagnostor configured to determine at least one software bug related to the error in the application by comparing the similarity and a first threshold.

In a fourth aspect of the present disclosure, there is provided a computer storage medium. The computer storage medium comprises a computer program code stored thereon. The computer program code, when executed in a processor, causes the processor to perform any method of the first aspect of the present disclosure.

Although drawings illustrate specific embodiments in an exemplary way, it should be appreciated that depictions of specific embodiments in the text are not intended to limit the embodiments in the disclosed specific forms.

BRIEF DESCRIPTION OF THE DRAWINGS

The objects, advantages and other features of the present disclosure will become more apparent from content disclosed hereunder and appended claims. A non-limiting description of preferred embodiments is given herein only for exemplary purpose.

DETAILED DESCRIPTION OF EMBODIMENTS

Various details are elaborated in the following description for illustration purpose. However, those skilled in the art will appreciate that embodiments of the present disclosure may be implemented without using these specific details. Hence, the present disclosure is not intended to be limited by the illustrated embodiments, but endowed the broadest scope consistent with principles and features described herein.

It should be appreciated that the terms "first", "second" and the like are only used to distinguish one element from another element. However, in fact, the first element may also be called the second element, and vice versa. In addition, it should be appreciated that "comprising" and "including" are only used to illustrate existence of the stated features, elements, functions and components, and do not exclude existence of one or more other features, elements, functions or components.

Figure 1:
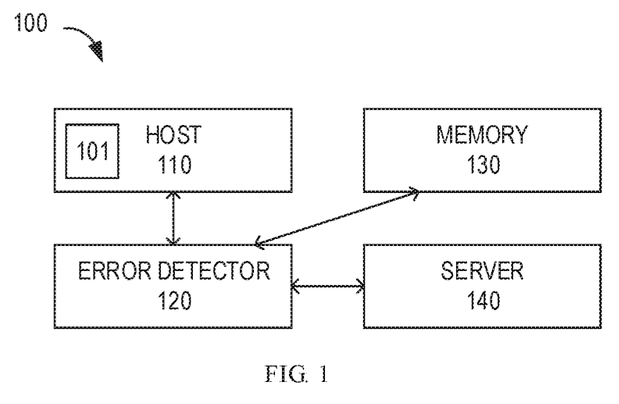
FIG. 1 illustrates a schematic structural diagram of a computer system in which embodiments of the present disclosure may be implemented.

FIG. 1 illustrates a schematic diagram of an example computer system 100 according to one embodiment of the present disclosure. However, it should be noted that in some embodiments, the specific architecture of the computer system shown in FIG. 1 is not required.

The example computer system 100 of FIG. 1 includes a user host 110, an error detector 120, a memory 130, and a server 140. The user host includes an application 101 running thereon. The error detector 120 may be implemented internally in the user host or externally to the user host 110 and may access information related to the application 101 to detect errors in the application 101. Additionally, the error detector 120 may be coupled to the memory 130 and the server 140 to access data and/or services therein.

The example computer system is different from a conventional computer system. In the conventional computer system, when there is a problem in a customer environment due to a bug in an application, a solution may be provided only depending on the customer's request, that is, with respect to the problem raised/reported by the customer.

For example, the process of the conventional solution is as follows. First, a customer files a support request when he/she finds a problem. The problem found may be a problem known to developers or a missing bug that has been fixed in a later version. Then, a support engineer asks the customer for relevant log and environmental information for investigating the problem and searches for relevant bugs and solutions in Product Knowledge Base (KB) web page. Finally, the support engineer provides a solution to the customer.

This conventional method is neither efficient nor advantageous. In addition, the approach will severely reduce customer satisfaction. More specifically, in the conventional approach, the support engineer is unable to proactively discover the problem and is therefore unable to respond effectively to the customer's problem the first time. Further, certain performance issues or other low-recurring issues may not be reproduced in a production environment. At the same time, certain serious error messages may not be recorded correctly. This may make it difficult to locate the problem and more difficult to find a solution to the problem. In addition, in some cases, there may be some risk of problems in the customer's environment, but the developer is not aware of this risk until the problem prevents the customer's business operations, causing serious consequences. In addition, when the development engineer participates in the resolution of the problem, the logs related to the bugs in the application and some important information may have been lost, which is disadvantageous for troubleshooting. These factors above will greatly increase the time for processing the customer's requests.

For the above problems and some other problems, a new problem detection and repair method and apparatus are proposed in the present disclosure. The method and apparatus presented in the present disclosure may automatically detect problems in an application, analyze the problems, and provide valuable information to, for example, a support engineer. The method may be used to proactively prevent errors.

In some embodiments, an application detection method is presented. The method may detect the customer's environmental problems the first time and prevent the problem from worsening. The proposed method may be a mechanism based on a certain machine learning algorithm and may actively detect any software product problem of the customer.

Alternatively or additionally, the method proposed in some embodiments may include analyzing an intrinsic relation between an error log in a customer environment and a related product error tracking system and/or a support solution KB site. The analysis results may be sent to an automated support server. As an example, the analysis results may include, but is not limited to: environmental information of the customer, deficiencies that are highly correlated with errors, related solutions from the support solution KB site (e.g., the server 140 in FIG. 1), and the like.

In some embodiments, a method of detecting and solving problems includes a log tracking operation to proactively detect software issues of customers and text vectorization and similarity comparison operations to analyze the intrinsic relation between error logs, software bugs, and the support solution KB to find a solution to the problem. Text vectorization may be implemented by, for example, but not limited to an algorithm such as the term frequency-inverse document frequency (TF-IDF) or Word2vec.

Some embodiments of the present disclosure are described below in order to facilitate understanding the solution proposed by the present disclosure.

Figure 2:
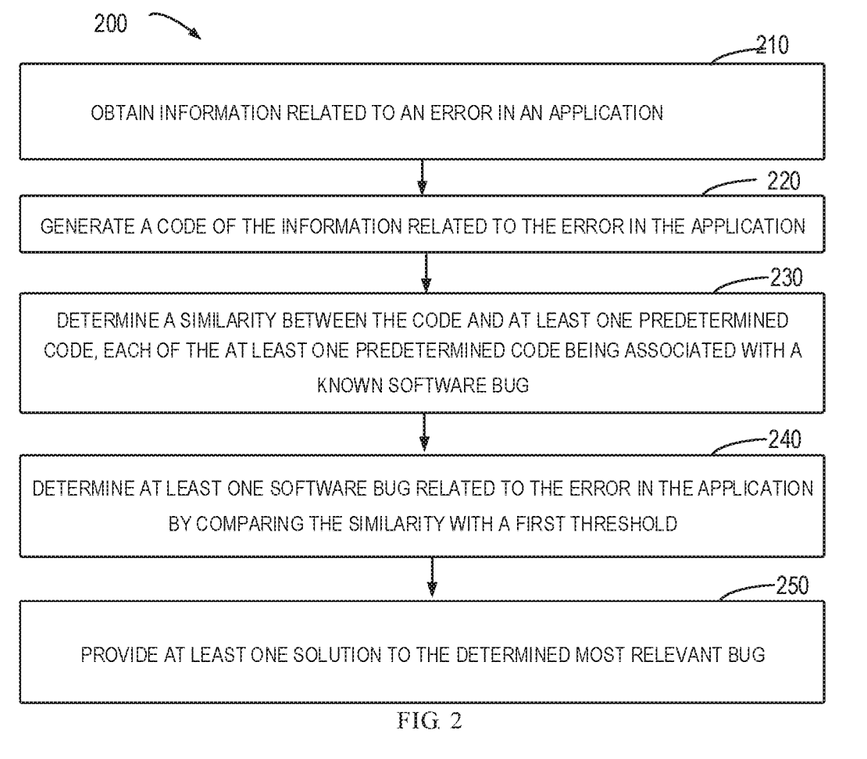
FIG. 2 illustrates a flow chart of a method of introducing error diagnosis according to an embodiment of the present disclosure.

FIG. 2 illustrates a method 200 for data search in accordance with an embodiment of the present disclosure. The method 200, or a portion thereof, may be implemented by, for example, the error detector 120 of FIG. 1. For ease of description, embodiments of method 200 are described below in connection with the error detector 120 and computer system 100 in FIG. 1. However, it should be understood that the method 200 is not limited to being implemented in the particular example structure of FIG. 1.

As shown in FIG. 2, at block 210, the error detector 120 obtains information related to an error in an application (e.g., the application 101 in FIG. 1). The application may include, but is not limited to, applications such as storage, browsing, gaming, chat, and the like. The operations in block 210 may include, for example, raw data collection.

As an example, the information related to the error in the application obtained in block 210 may include environmental information of the application, and at least one of the following: a critical error log segment from the customer environment, bug information from a bug tracking system, and solution information from a support page or a support server (e.g., the server 140 in FIG. 1). In the following, the obtained information may also be referred to as a corpus.

At block 220, the error detector 120 generates a code of the information related to an error in the application. Embodiments of the present disclosure are not limited to any specific encoding manner of this information. Only as an example, in some embodiments, the code may be obtained by vectorizing the information. For example, the error detector 120 may process the obtained corpus (e.g., log segments, bug information, support KB, etc.) as associated text vectors.

As a non-limiting example, at block 220, the error detector 120 may implement vectorization of text by the term frequency (TF) or the term frequency-inverse document frequency (TF-IDF). Both TF and TF-IDF may be viewed as a numerical statistic that is intended to reflect the importance of a word is to a document in a collection or corpus. TF indicates the number of times that a certain term occurs in a certain document. For example, the frequency $tf_{td}$ of a term with index t in a document with index d may be determined by Equation (1).

$$tf_{td} = \frac{\text{number of times that word } t \text{ occurs in doc } d}{\text{Total words in document } d} \quad (1)$$

In some embodiments, considering different words have different weight for each document, inverse document frequency (IDF) used in a natural language processing field may be introduced. The IDF indicates an inverse proportion of the word, and may be determined by Equation (2):

$$idf_t = \log_2\left(\frac{N}{ft+1}\right) \quad (2)$$

where N represents the number of documents in a collection and ft+1 represents the frequency of occurrence of the document containing the term t in the collection, where the operation of "+1" facilitates data smoothing thereby avoiding the invisible term t in the collection.

In some embodiments, the TF-IDF of the word t and the document d may be determined by Equation (3):

$$\text{TFIDF} = tf_{td} * idf_t \quad (3)$$

where $tf_{td}$ and $idf_t$ may be determined by Equations (1) and (2), respectively.

Figure 3:
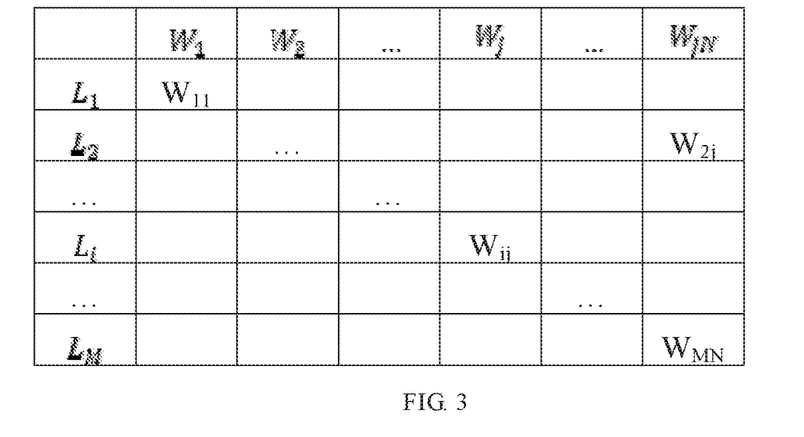
FIG. 3 illustrates a TF-IDF weight matrix according to an embodiment of the present disclosure.

In some embodiments, the determined TF-IDF may be represented in a form of a matrix as shown in FIG. 3, and therefore the matrix may be referred to as a TF-IDF weight matrix. In the example of FIG. 3, it is assumed that the dimension of the matrix is N×M, where M is the number of rows and represents the number of log segment to be classified and N is the number of columns and represents the number of different words. That is to say, each column $W_j$ of the matrix corresponds to a word, and each row $L_i$ corresponds to a document, for example, the error log segment. The value $W_{ij}$ of the intersection of the $i^{th}$ row and the $j^{th}$ column represents the TF-IDF weight of the word j in the log segment i. That is, the matrix contains the TF-IDF value for each unique word in each error log segment.

As an example but not a restriction, the following pseudo code may be used to create a TF-IDF weight matrix:

Pseudo code:

/It is assumed that the TF-IDF matrix is a matrix $\begin{pmatrix} W_{11} & \cdots & W_{1,M} \\ \vdots & \ddots & \vdots \\ W_{M1} & \cdots & W_{MN} \end{pmatrix}$ with a dimension of N×M.

```
def tf_result(word, doc, total_words):
for I in doc:
if I == word:
 occurrence = occurrence + 1
 return occurrence/total_words
 def idf_result (corpus, ft):
 return log(N/(ft+1))
for i in all_unique_words_in_corpus:
for j in all_docs:
 if i in j :
    ft = ft + 1
 for j in all_docs:
  tf = tf_result(i,j,total_words_for_j)
  idf = idf_result(N,ft+1)
  tf_idf_matrix[index(i)][index(j)]=tf*idf
```

Alternatively, in some embodiments, vectorization of text may be implemented by a neural network-based language model, e.g., Word2vec. Word2vec is a group of related models that are used to generate word embedding. Word embedding is a collective name for a group of language modeling and feature learning techniques in natural language processing (NLP) where words or phrases from a vocabulary are mapped to vectors of real numbers. Conceptually it involves a mathematical embedding from a space with one dimension per word to a continuous vector space with a lower dimension. These models are shallow neural networks, for example a four-layer neural network which may include 1 input layer, 1 projection layer, 1 hidden layer and 1 output layer. After being trained, the neural network may be used to reconstruct linguistic contexts of words.

Word2vec may take a large amount of corpus as its input and produces a vector space, typically of several hundred dimensions, with each unique word in the corpus being assigned a corresponding vector in the space. Word vectors are positioned in the vector space such that words that share common contexts in the corpus are located in close proximity to one another in the space.

Figure 4:
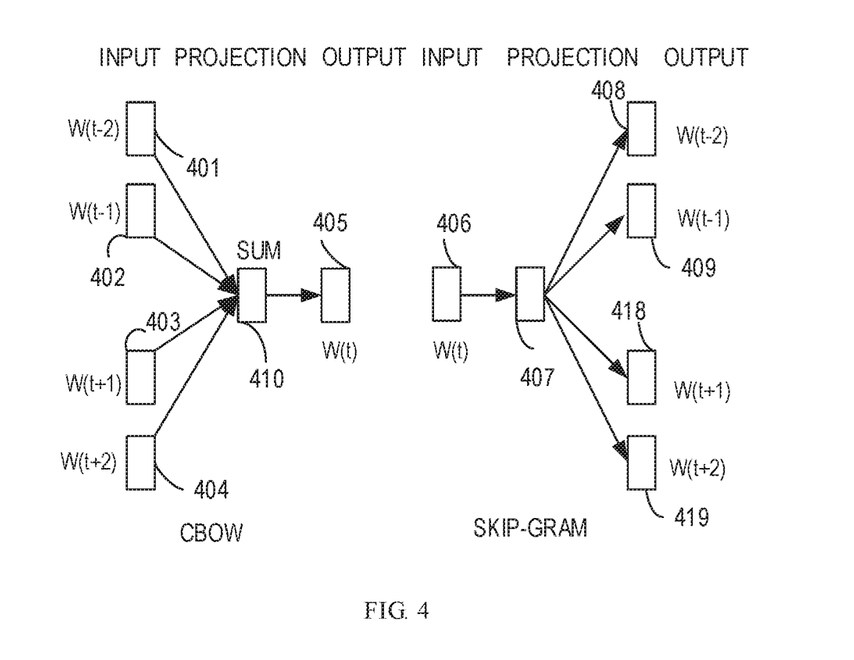
FIG. 4 illustrates an example model architecture for word vectorization according to an embodiment of the present disclosure.

Word2vec may employ a model architecture of continuous bag of words (CBOW) or Skip-gram shown in FIG. 4. The CBOW uses the context (W(i),i=t−2,t−1,t+1,t+2) 401-404 to predict one word W(t) 405 for example by summating 401. That is, a summating operation 410 is performed at the projection layer using the context W(i) 401-404 as input, and thereby obtaining an output W(t) 405. While, Skip-gram uses one word W(t) 406 to predict its context W(i) (i=t−2, t−1, t+1, t+2) 408, 409, 418, and 419. That is, with W(t) 406 as an input, the output W(i) is obtained by an operation 407 of the projection layer.

Prior to use, a known corpus may be used to train the neural network-based language model, e.g., the Word2vec model. This known corpus may include the contents of all logs and bugs. Throughout the training process, the words in the corpus are continuously fed to the model to train the model to predict its adjacent words. In the training phase, input words and output adjacent words are known data and may be considered as samples and labels. A desired training result is a "word embedding" representation of each word. "Word embedding" is a weight matrix between the input layer and the projection layer.

Once the training is completed, the last layer, an output layer, is removed from the model and an input layer and a hidden layer are retained. In addition, a weight matrix (word vector) between the input layer and the projection layer is also retained. The trained model is used to input a word from the vocabulary, then the hidden layer will provide the "word embedding" of the input word, namely, the word vector, as an output.

Figure 5:
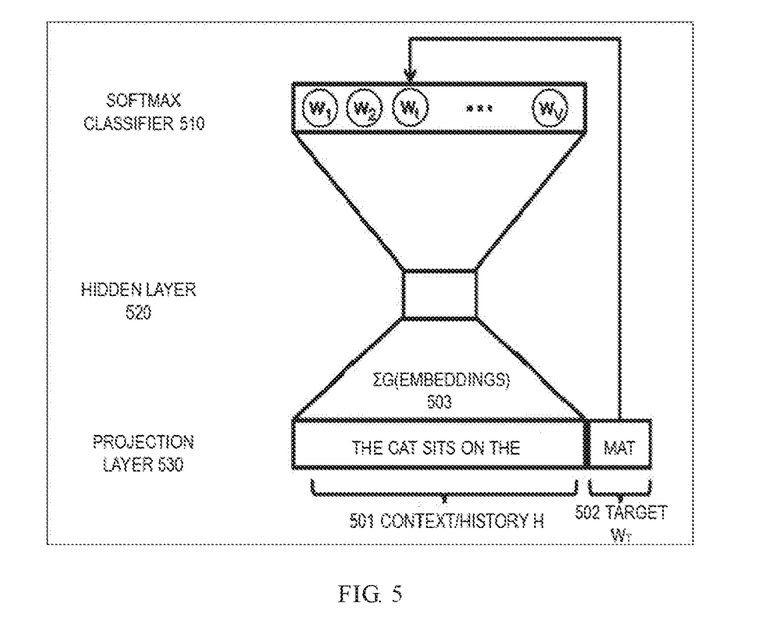
FIG. 5 illustrates a structure of an example neural network for word vectorization according to an embodiment of the present disclosure.

FIG. 5 shows a structure of an example neural network including a projection layer 530, a hidden layer 520, and an output layer 510, where the output layer 510 includes a softmax-based classifier. In this example, an adjacent word "mat" is predicted with a context/history h 501 (e.g., English words "the", "cat", "sits", "on", "the"). That is, "mat" in this example is a word $W_t$ 502 with a maximum probability calculated by the model according to the context "the cat sits on the". In this example, an accumulation summation (Σg (embeddings)) operation 503 is performed at the projection layer 520. The processing of the word vector by the projection layer usually includes the following methods: splicing, summating, and summating and averaging. The latter two processing manners are usually used in the Word2vec model.

Figure 6:
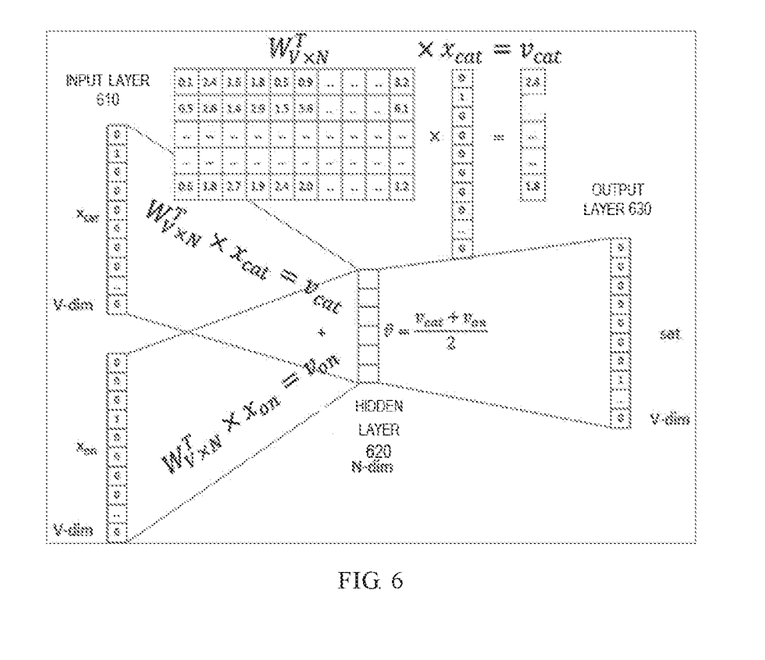
FIG. 6 illustrates a model training process taking a CBOW model in word2vec as an example according to an embodiment of the present disclosure.

FIG. 6 shows the process of model training with the CBOW model in word2vec as an example. In FIG. 6, $X_{cat}$ and $X_{on}$ correspond to a one-hot vector of an input layer 610. In the one-hot vector, 1 bit corresponding to the position of the word in a dictionary is set to 1, and the remaining bits are set to 0. For example, in this example, it is assumed that cat is at position 2 in the dictionary, so its one-hot vector is (0, 1, 0 . . . ) as shown in FIG. 6. "sat" is an output result of an output layer 630.

In addition, in the example of FIG. 6, V-dim represents the dimension of $X_{cat}$, namely, the number of elements in the $X_{cat}$. Similarly, N-dim corresponds to the dimension of the hidden layer 620. In this example, an average vector of $X_{cat}$ and $X_{on}$ is calculated at the hidden layer. $W_{V\times N}^T$ is a weight matrix between the input layer 610 and the hidden layer 620, and each iteration is constantly updated during the training process. When a probability function converges, the entire model training ends, and the $W_{V\times N}^T$ obtained at this time is an expected word vector matrix, in which word vectors of all words are recorded. Specifically, each column in the $W_{V\times N}^T$ is a vector of a word.

Figure 7:
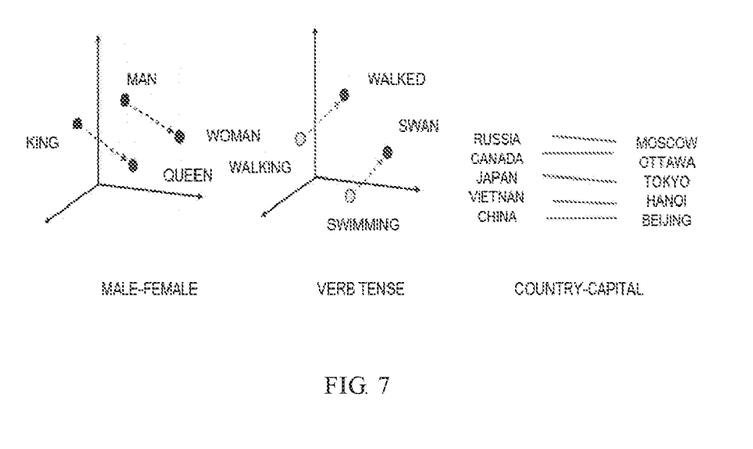
FIG. 7 illustrates related word pairs obtained according to an embodiment of the present disclosure.

In contrast to TF-IDF, the word2vec may capture semantic similarity, and the model which is trained by the word2vec can know relevant words pairs in a specific corpus, for example, a plurality of words pairs as shown in FIG. 7.

As an example, in the word2vec model, 'snapup' represents 'backup', '$L_0$' represents full backup, L1 represents incremental backup, and so on. If sentences "create a dataset and backup" and "create dataset and snapup" in the corpus are input into the word2vec, then "backup" and "snapup" will get very similar word vectors. This is because "backup" and "snapup" have the same semantic context and therefore have similar output in the word2vec.

It may be seen from the examples in FIGS. 5 to 7 that the word vector trained by the word2vec model may capture the semantic relationship between words in the corpus, so that a sentence vector calculated by using such word vector is more beneficial to calculating the similarity of a text log.

Exemplarily and non-restrictively, in some embodiments, an average word vector in one log segment may be used to obtain a vector of the log segment. In some embodiments, a sentence vector of a log segment may be calculated using Equation (4):

$$\text{sentence vector} = \frac{\sum_{1}^{M} W_i}{M} \quad (4)$$

where M represents the total number of words in one log segment while the dimension of each word vector is n. $W_i$ represents the $i^{th}$ word in the log segment, and $W_i = \{V_1 \ldots V_n\}$, $V_i$ represents the $i^{th}$ sub item in the word vector.

Although a number of examples of generating the code of the information are provided above, it should be understood that embodiments of the present disclosure are not limited to the listed specific encoding manner.

Additionally, in some embodiments, the error detector 120 may delete pause words in the information prior to generating the code of the information. "Pause words" may include common words and/or punctuation marks in a language that do not make much sense for context. For example, the articles "a", "the", the pronoun "which" in English language, and the like.

Reference is still made to FIG. 2. At block 230, the error detector 120 determines the similarity between the code generated at block 220 (e.g., a word vector or a sentence vector generated by the TF-IDF or Word2vec model) and at least one predetermined code, where each predetermined code is associated with a known software bug. In some embodiments, the at least one predetermined code may be from a pre-stored corpus.

In some embodiments, the at least one predetermined code may be updated by the error detector 120 or another apparatus based on known software bugs. For example, the error detector 120 may obtain information related to known software bugs and update the at least one predetermined code based on the information. That is, when the known software bugs are updated (e.g., increased) over time, at least one predetermined code for comparison with the code of the information is also updated (e.g., increased), such that subsequent error diagnosis is more accurate and efficient.

Embodiments of the present disclosure are not limited to determining the similarity between the code of the information related to the error and the predetermined code in any specific manner. As an example, in some embodiments, the similarity of text in the error log and a predetermined bug description may be determined based on a Euclidean distance or a cosine function in the text vector space.

In some embodiments, the Euclidean distance between text vectors may be determined by Equation (5):

$$D(x,y) = \sqrt{\sum_{w=1}^{N}(S_{wx}-S_{wy})^2} \quad (5)$$

where $D(x, y)$ represents the distance between two text vectors x and y, N is the dimension of each text vector, and $S_{wx}$ represents the $w^{th}$ subvector of the text vector x (e.g., the text vector determined in block 220), $S_{wy}$ is the corresponding subvector of another text vector y (e.g., a text vector stored in the database, i.e., a predetermined code). The smaller the value of $D(x, y)$ is, the higher the similarity between the two text vectors x and y is.

Alternatively, in some embodiments, a method of determining the similarity of the text vectors A and B may be determined by calculating a cosine function by Equation (6):

$$\cos\theta = \frac{\sum_{1}^{n} A_i * B_i}{\sqrt{\sum_{1}^{n} A_i^2} + \sqrt{\sum_{1}^{n} B_i^2}} \quad (6)$$

where $A=(A_1, A_2, \ldots, A_n)$, $B=(B_1, B_2, \ldots, B_n)$, where n represents the dimension of the text vector. The value range of $\cos\theta$ is $(-1, 1)$, where 1 means that two vectors have the same orientation, and $-1$ means that the two vectors are oriented with a difference of 180° i.e., they are at locations diametrically opposed.

Returning to FIG. 2, at block 240, the error detector 120 determines at least one software bug related to an error in the application based on the similarity between the generated code and the at least one predetermined code. That is, based on the comparison result of the text vectors (e.g., the similarity result calculated by Equation (5) or (6), the error detector 120 may determine one or more most relevant bugs.

In some embodiments, the error detector 120 may compare the similarity determined in block 230 to a threshold to determine one or more software bugs associated with an error in the application. For example, a bug corresponding to the highest similarity exceeding the threshold may be determined as a bug most relevant to the error in the application. The determined bugs may be provided to the developer of the application in order to eliminate the error.

In some embodiments of the present disclosure, according to method 200, it is possible that at least one solution may be provided by the error detector 120 at block 250 for the determined most relevant/most probable bug.

Figure 8:
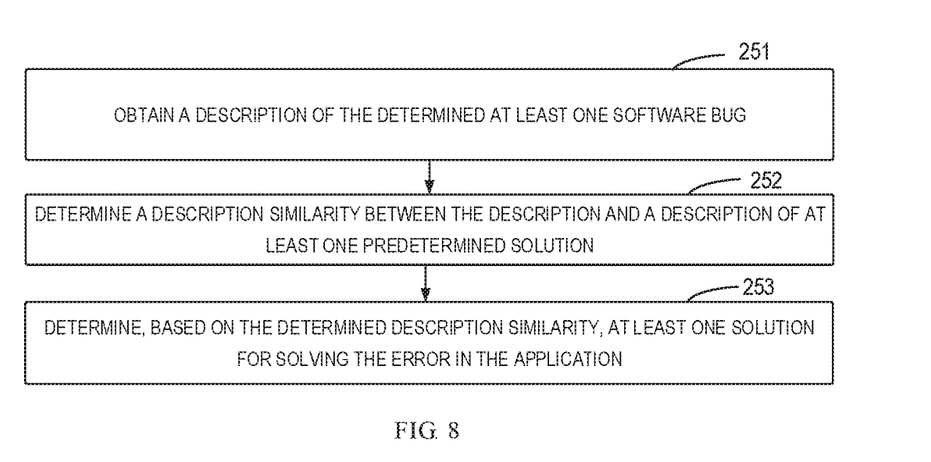
FIG. 8 illustrates operations of a solution for determining an error according to an embodiment of the present disclosure.

As an example, a feasible embodiment of the operation in block 250 is shown in FIG. 8. In this example, the error detector 120 obtains a description of the determined at least one software bug (e.g., a title of the bug) at block 251, and at block 252, determines a description similarity between the description and the description of at least one predetermined solution. As an example, at the block 252, the error detector 120 may obtain a vectorized representation of the description of the at least one software bug. This vectorized representation may be obtained, for example, by the TF-IDF or the Word2vec model. Then, at the block 252, the error detector 120 may determine the description similarity by comparing the vectorized representation of the description with the description vector of the at least one predetermined solution. The operations herein may be similar to the operations of block 230 of FIG. 2. That is, the error detector 120 may determine a description similarity between the description vector of the bug and the description vector of the at least one predetermined solution based on the Euclidean distance or the cosine function between the vectors.

In some embodiments, the at least one predetermined solution may be from a support web page or a support server. Additionally, it should be understood that the at least one predetermined solution may be updated. For example, the error detector 120 (or a support server) may obtain an available solution (either periodically or based on event triggering), and based on the obtained available solution, update the at least one predetermined solution for subsequent error diagnosis and determination of the solution. That is, when the available solution is updated, at least one predetermined solution for comparison in block 252 may also be updated accordingly to more accurately determine a solution for solving errors in the application.

At block 253, the error detector 120 determines at least one solution for solving the error in the application based on the determined description similarity. For example, the error detector 120 may compare the determined description similarity with a threshold to determine at least one solution for solving the error in the application. A predetermined solution corresponding to the highest similarity above the threshold may be determined as a solution to the error found in the application.

Another aspect of the present disclosure provides an apparatus for error diagnosis. The apparatus includes a data collector configured to obtain information related to an error in an application, an information encoder configured to generate a code of the information related to an error in the application, an analyzer configured to determine a similarity between the code and at least one predetermined code, each of the at least one predetermined code being associated with a known software bug, and an error diagnostor configured to determine at least one software bug related to an error in the application by comparing the similarity and the first threshold.

In some embodiments, the information encoder may be implemented by a text vectorizer. The text vectorizer obtains the code of the information by vectorizing the information.

In some embodiments, the analyzer may be implemented as part of the error diagnostor and configured to compare the similarity between the vector of error information and a predetermined vector. The apparatus/system in FIG. 9 below may be regarded as an example implementation of the apparatus.

Figure 9:
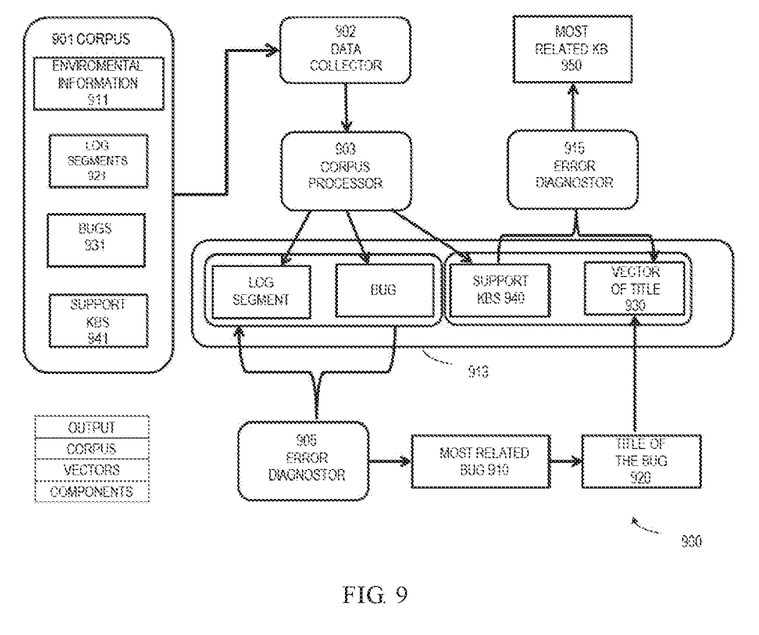
FIG. 9 illustrates an example architecture of an apparatus for detecting an error of an application according to an embodiment of the present disclosure.

FIG. 9 shows an example architecture of an apparatus (or system) 900 that may be used to detect an error in an application. The apparatus (or system) 900 may be configured to implement the method 200 of FIG. 2 or a portion thereof.

The example architecture includes a component data collector 902, a corpus processor 903, and an error diagnostor 905. The data collector 902 is responsible for the collection of a corpus 901. For example, the data collector 902 may collect raw data. The raw data for example may include one or more of the following: environmental information (e.g., software version) 911, critical error log segment 921 from the customer environment, all bug information 931 that may be obtained from the bug tracking system, and all solution information 941 that may be obtained from the support solution page.

The corpus processor 903 in FIG. 9 processes the corpus collected by the data collector 902. The processing may include processing the corpus (e.g., log segments, errors, support KB) into related text vectors. In some embodiments, the corpus processor 903 may also delete pause words in the collected corpus. For example, the articles "a", "the", and the pronoun "which" and the like. Text vectorization 913 is a key operation of the corpus processor 903. This operation provides input to the error diagnostor 905.

Embodiments of the present disclosure are not limited to implementing vectorization of text in any specific manner. Exemplarily and non-restrictively, vectorization of text may be implemented using TF, TF-IDF, or Word2vec.

In FIG. 9, the error diagnostor 905 analyzes the similarity between text vectors provided by corpus processor 903 and bugs stored in the database, and determines one or more most relevant bugs 910 based on the comparison.

For example, in some embodiments, taking the log segment 921 in the customer environment as an input, the error diagnostor 905 may calculate the most relevant 3 bugs based on the log vector provided by the corpus processor 903.

Since log segments may not be included in the support KB solution, in this case, using log segment similarity can only capture errors/bugs and cannot determine the solution. To facilitate the determination of a solution corresponding to a given error/bug, in some embodiments, it is possible to determine an error title 920 of the error/bug, generate a corresponding vector 930 of the error title, and select, from a support KB 940 solution, a solution 950 that best matches the error title vector.

For example, where the error diagnostor 905 has determined three most critical errors/bugs, it may invoke the corpus processor 903 to vectorize titles of the determined errors/bugs. In some other embodiments, the vectorizing operation may also be implemented by an additional processor. The vector corresponding to the title of the most relevant bug is provided to the error diagnostor 915. The vector of the title is compared to the title in the support KB solution to determine text similarity. This operation may also be performed by calling the error diagnostor 905.

For example, the error diagnostor 905 or 915 may determine the most relevant one or more support KB solutions by analyzing the similarity between the title of the most relevant bug and the vector in the support KB. It should be understood that embodiments of the present disclosure are not limited to analyzing the similarity between the title of the most relevant bug and the vector in the support KB in any specific manner. As a non-limiting example only, the similarity may be determined based on the Euclidean distance in the Equation (5) or the cosine function in the Equation (6).

Based on the description of the above embodiments, it is known that it is possible to, through the method and apparatus proposed by the present disclosure, obtain a bug highly correlated with an error in an application, and optionally, determine a solution for the determined one or more errors/bugs based on the text similarity between the vector of the error title and the title in the support KB solution. Therefore, in some embodiments, the output of the error diagnosis may include, for example, customer's environmental information, one or more errors that are most relevant to the customer's problem, and the most relevant one or more potential solutions in the support KB. This output information may be used by developers to solve errors/bugs in software applications.

In some embodiments, the proposed method and apparatus also have an incremental learning ability to accommodate changes in product logs and errors over time. As a non-limiting example, it is possible to update the corpus periodically or irregularly (e.g., by the data collector 902 in FIG. 9), and re-train an error diagnostic tool (e.g., by a corpus processor 903 in FIG. 9), to implement the incremental learning ability. In addition, it is also possible to update a vectorization tool (such as a TF-IDF matrix or a neural network language model) based on changes of the corpus. Through constant updates, the error diagnostic tool may constantly provide accurate results for new errors in the customer environment.

The solution in some embodiments of the present disclosure is primarily based on text similarity in a natural language process (NLP) region. The solution may compare text similarity or semantic similarity twice, for example, by means of the TF-IDF or the Word2vec (shallow neural network) model, to find out the customer's error and the inherent relationship between the error and the support solution, and output for example the following information for the developer to solve problems in the software application: one or more errors most relevant to the customer error, a title of the bug, and one or more most relevant solutions in the support KB.

The solution proposed by the present disclosure has many advantages over previous solutions. First, the proposed solution saves time. Benefiting from embodiments of the present disclosure, customers do not need to spend time communicating with the support engineer about what is happening in the environment. In addition, customers do not have to collect error logs and environmental information by themselves. This will save time for customers and support engineers, and even time for software engineers. Second, the proposed solution can save costs. In addition to saving time, embodiments of the present disclosure may also save the workload of the customer retrieving the error logs and reporting support requests. In addition, it may also save the workload of the supporting engineers and software engineers in solving problems. Third, the proposed solution can increase customer satisfaction. For example, embodiments of the present disclosure are able to proactively detect problems while reducing the duration of feedback to customers. At the same time, embodiments of the present disclosure are able to proactively provide corresponding solutions to customer problems, rather than the customer passively requesting for these solutions from support engineers. Due to these benefits, customer satisfaction will be improved.

The present disclosure provides a solution about proactively monitoring the health of the application (e.g., a storage system, a data protection system, etc.).

Figure 10:
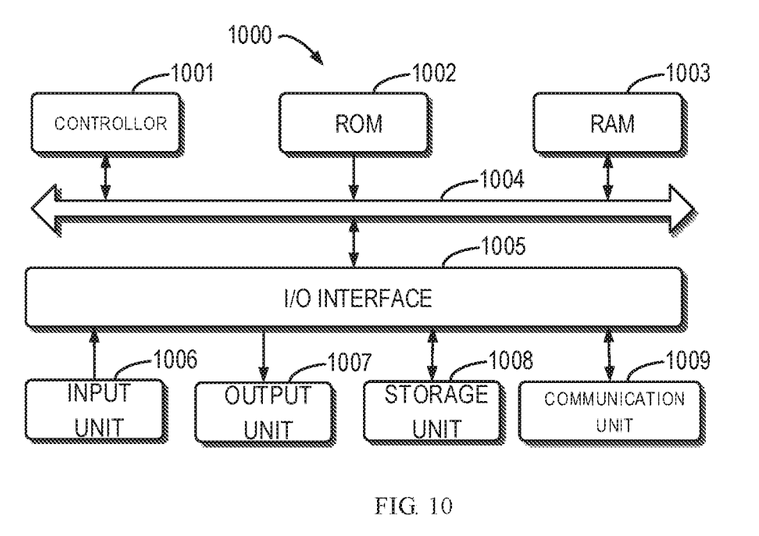
FIG. 10 illustrates an exemplary structural diagram of an electronic device according to an embodiment of the present disclosure.

FIG. 10 illustrates a schematic block diagram of an electronic device 1000 that may be used to implement an embodiment of the present disclosure. As shown in FIG. 10, the electronic device 1000 comprises a controller or processing unit (e.g., CPU) 1001 which may perform various appropriate actions and processing based on programs stored in a read-only memory (ROM) 1002 and/or a random access memory (RAM) 1003. The ROM 1002 and/or RAM 1003 may store various programs and data needed by operation of the electronic device 1000. The controller 1001, ROM 1002 and RAM 1003 are connected to one another via a bus 1004. Especially, the electronic device 1000 further comprise one or more dedicated processing units (not shown) which may also be connected to the bus 1004.

An input/output (I/O) interface 1005 may be also connected to the bus 1004. A plurality of components in the electronic device 1000 are connected to the I/O interface 1005, including: an input unit 1006 such as a keyboard, a mouse and the like; an output unit 1007, e.g., various kinds of displays and a loudspeaker, etc.; a storage unit 1008, e.g., a magnetic disk, an optical disk, etc.; a communication unit 1009, e.g., a network card, a modem, and a wireless communication transceiver, etc. The communication unit 1009 allows the electronic device 1000 to exchange information/data with other devices through a computer network such as an Internet and/or various kinds of telecommunications networks.

In some embodiments, the controller 1001 may be configured to execute various processes and processing described above, e.g., the function of the method 200 and apparatus 900. For example, in some embodiments, various modules of the method 200 and/or apparatus 900 may be implemented as a computer software program that is tangibly embodied on a machine readable medium, e.g., the storage unit 1008. In some embodiments, part or all of the computer program may be loaded and/or mounted onto the electronic device 1000 via ROM 1002 and/or communication unit 1009. When the computer program is loaded to the RAM 1003 and executed by the controller 1001, one or more operations of the method 200 as described above may be executed. Alternatively, in other embodiments, the controller 1001 may also be configured in any other manners to implement the process/method mentioned above.

Especially, according to embodiments of the present disclosure, the method and apparatus described above with reference to FIGS. 2-10 may be implemented as a computer program product. The computer program product may be tangibly stored on a non-transitory computer readable storage medium and include computer-executable instructions which, when executed, enable a machine to implement aspects of the present disclosure.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, e.g., punch-cards or raised structures in a groove having instructions recorded thereon, and any suitable combination of the foregoing.

Computer readable program instructions for carrying out operations of the present disclosure may be assembler instructions, instruction-set-architecture (ISA) instructions, machine instructions, machine related instructions, microcode, firmware instructions, state-setting data, or either source code or object code written in any combination of one or more programming languages, including an object oriented programming language such as JAVA, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In to scenario related to a remote computer, the remote computer may be connected to the user's computer through any type of network, including a local area network (LAN) or a wide area network (WAN), or the connection may be made to an external computer (for example, through the Internet with an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, may be implemented by computer readable program instructions.

Embodiments of the present disclosure have already been described for illustration purpose, but the present disclosure is not intended to be limited to these disclosed embodiments. Without departing from the essence of the present disclosure, all modifications and variations fall within the protection scope of the present disclosure as defined by the appended claims.

We claim:

1. A method of application error diagnosis, comprising:
obtaining information related to an error in an application;
generating a code of the information related to the error in the application, wherein generating the code comprises vectorizing the information to obtain the code;
determining a similarity between the code and at least one predetermined code, wherein the at least one predetermined code is associated with a known software bug; and
determining at least one software bug related to the error in the application by comparing the similarity with a first threshold.

2. The method according to claim 1, wherein vectorizing the information comprises:
vectorizing words in the information to obtain word vectors; and
obtaining a vector of a sentence in the information based on the word vectors.

3. The method according to claim 1, wherein generating the code further comprises:
deleting a pause word from the information; and
generating the code based on the information with the pause word deleted.

4. The method according to claim 1, wherein vectorizing the information is based on at least one selected from a group consisting of a term frequency-inverse document frequency (TF-IDF) and a Word2vec model.

5. The method according to claim 1, wherein the information related to the error in the application comprises environmental information of the application and at least one of the following:
a critical error log segment from a customer environment,
bug information from a bug tracking system, and
solution information from at least one selected from a group consisting of support page and a support server.

6. The method according to claim 1, wherein the at least one predetermined code is from a pre-stored corpus.

7. The method according to claim 1, wherein determining the similarity between the code and the at least one predetermined code comprises:
determining the similarity based on at least one selected from a group consisting of an Euclidean distance and a cosine function between the code and the at least one predetermined code.

8. The method according to claim 1, further comprising:
obtaining information related to the known software bug; and
updating the at least one predetermined code based on the information related to the known software bug for subsequent error diagnosis.

9. The method according to claim 1, further comprising:
obtaining a description of the at least one software bug;
determining a description similarity between the description and a description of at least one predetermined solution; and
determining, based on a comparison of the description similarity with a second threshold, at least one solution for solving the error in the application.

10. The method according to claim 9, wherein the at least one predetermined solution is obtained from a support webpage or a support server.

11. The method according to claim 9, wherein determining the description similarity comprises:
obtaining a vectorized representation of the description of the at least one software bug; and
determining the description similarity by comparing the vectorized representation with a description vector of the at least one predetermined solution.

12. The method according to claim 11, wherein determining the description similarity by comparing the vectorized representation and the description vector of the at least one predetermined solution is based on one selected from a group consisting of an Euclidean distance and a cosine function between the vectorized representation and the description vector of the at least one predetermined solution.

13. The method according to claim 9, wherein the description comprises a title of the at least one software bug.

14. The method according to claim 9, further comprising:
obtaining an available solution related to the application; and
updating, based on the available solution, the at least one predetermined solution for subsequent error diagnosis.

15. An apparatus for application error diagnosis, comprising:
a data collector configured to obtain information related to an error in an application;
an information encoder configured to generate a code of the information related to the error in the application, wherein generating the code of the information comprises vectorizing the information to obtain the code;
an analyzer configured to determine a similarity between the code and at least one predetermined code, wherein the at least one predetermined code is associated with a known software bug; and
an error diagnostor configured to determine at least one software bug related to the error in the application by comparing the similarity and a first threshold.

16. The apparatus according to claim 15, wherein the information encoder is further configured to:
vectorize words in the information to obtain word vectors; and
obtain a vector of a sentence in the information based on the word vectors.

17. The apparatus according to claim 15, wherein the information encoder is configured to:
delete a pause word from the information; and
generate the code based on the information with the pause word deleted.

18. A computer program product tangibly stored on a non-transient computer readable medium and including machine executable instructions which, when executed, cause a machine to perform a method, the method comprising:
obtaining information related to an error in an application;
generating a code of the information related to the error in the application, wherein generating the code comprises vectorizing the information to obtain the code;
determining a similarity between the code and at least one predetermined code, wherein the at least one predetermined code is associated with a known software bug; and
determining at least one software bug related to the error in the application by comparing the similarity with a first threshold.

* * * * *